United States Patent [19]

Ternehall

[11] 4,084,671
[45] Apr. 18, 1978

[54] DEVICE FOR WEAR WARNING IN A SERVO OPERATED DISC CLUTCH

[75] Inventor: Runo Roy Oskar Ternehall, Skarhamn, Sweden

[73] Assignee: AB Volvo, Gothenburg, Sweden

[21] Appl. No.: 723,301

[22] Filed: Sep. 14, 1976

[30] Foreign Application Priority Data

Sep. 18, 1975 Sweden .................................. 7510448

[51] Int. Cl.² ........................ F16D 66/02; G08B 7/04
[52] U.S. Cl. .................................. 192/30 W; 92/5 R; 116/4; 116/67 R; 116/124 D; 188/1 A
[58] Field of Search .................... 192/30 W; 188/1 A; 92/5 R; 116/4, 67 R, 124 D

[56] References Cited

U.S. PATENT DOCUMENTS

| 535,264 | 3/1895 | Smith | 192/30 W |
|---|---|---|---|
| 1,557,957 | 10/1925 | Amrhein | 116/124 D |
| 2,852,757 | 9/1958 | Fawick | 340/52 |
| 2,914,630 | 11/1959 | Ralston | 92/5 R |
| 3,406,800 | 10/1968 | Buchanan et al. | 192/30 W |

*Primary Examiner*—Allan D. Herrmann
*Attorney, Agent, or Firm*—Young & Thompson

[57] ABSTRACT

A disc clutch servo mechanism cylinder has a signal bore extending from the cylinder working chamber to atmosphere. In normal operating state a pin seals this bore. The pin extends into the chamber and when the clutch is worn the piston will come close to the cylinder bottom and push the pin outwards. This movement causes the pin to open an air passage from the chamber to atmosphere, whereby an acoustic signal indicates clutch wear.

5 Claims, 1 Drawing Figure

U.S. Patent  April 18, 1978  4,084,671
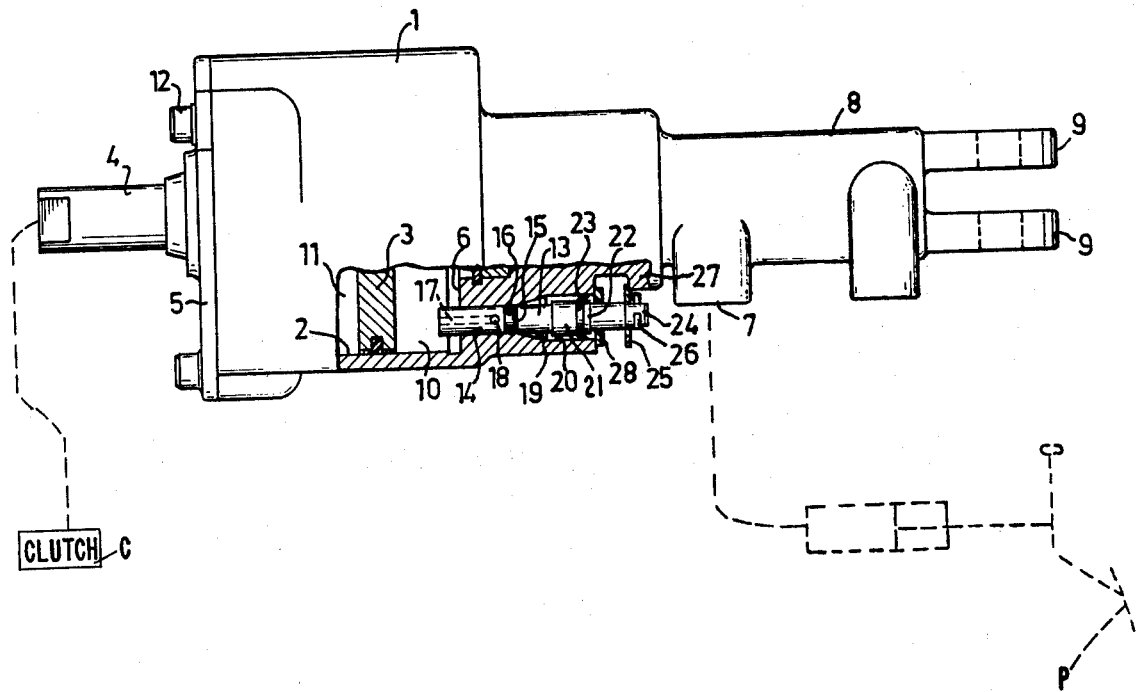

DEVICE FOR WEAR WARNING IN A SERVO OPERATED DISC CLUTCH

The present invention relates to a servo mechanism for a disc clutch, especially for motot vehicles, comprising a servo piston movable in a cylinder, the piston rod of which is connected to the clutch and is disposed to disengage the same when pressure medium is supplied to the cylinder working chamber between the piston and the bottom of the cylinder.

In disengaging a disc clutch in a vehicle, for example when changing gears, the disc clutch can be influenced by a throwout bearing, which via a linkage system is operated by a pressure medium driven servo piston.

Since the clutch disc is subjected to wear a certain amount of play is required in the system so that the clutch can engage completely in spite of the wear. It is previously known to allow this play to occur between the throwout bearing and the throwout fingers. At this location however the play cannot be allowed to be too great, and therefore adjustments must be made relatively often. This disadvantage has been eliminated by the development work which is the basis of the present invention, by the throwout bearing being mounted without any play against the throwout fingers. Instead a large amount of play is allowed in the servo mechanism by permitting the piston a long movement in the working chamber of the cylinder. As the disc is worn down, the servo piston, when the clutch is engaged, will come closer and closer to the bottom of the cylinder. Thus the risk exists that if the disc wear is checked infrequently, the servo piston will come into contact with the bottom of the cylinder and thus not allow full engagement of the disc clutch. The clutch will then slip and burn the disc.

The intention of the present invention is to eliminate this risk and to prevent the servo piston from coming into contact with the bottom of the cylinder.

According to the invention this is achieved in that a means for sensing the position of the piston is connected to a signalling device or the like and is disposed so that when the piston, as a result of a worn clutch disc, assumes a position close to the bottom of the cylinder it causes the signalling device to produce a signal to warn the driver.

The sensing means and the signalling device can be constructed in a variety of ways, for example as a piston rod actuated switch and a warning light. In a servo mechanism with a compressed air operated servo piston, the signal device, according to a preferred embodiment of the invention, comprises a valve, which controls a connection between the working chamber of the cylinder and the atmosphere and which in the normal operating state of the servo mechanism keeps the connection closed but which is actuated to the open position by the sensing means when it senses that the piston is close to the bottom of the cylinder, whereby air from the working chamber flows through the connection and gives an acoustic signal to the driver. This embodiment has the further advantage that the servo air pressure in the cylinder working chamber falls, so that the driver must exert more pressure on the pedal to disengage the clutch. Thus the driver is made aware of the clutch wear by the extra required pedal pressure also.

A preferred further development according to the invention of this embodiment is characterized in that a pin is displaceably disposed in an axial bore in the bottom of the cylinder with its inner end extending into the path of motion of the piston near the bottom of the cylinder, that the pin in its inner normal position, unaffected by the piston, seals the bore shut, and that the pin, in an outwardly displaced signalling position caused by the motion of the piston, opens an air flow path through the bore. Thus an inexpensive combination of sensing means and signalling device is obtained, which as a result of its simplicity is mechanically reliable.

An additional further development of the invention is characterized in that the pin in its normal position extends with it outer end beyond the bottom of the cylinder and is provided at its outer end with a radially extending deformable means, which follows the extension motion of the pin to the signalling position, and that a fixed stop is so disposed in the path of motion of the means that it deforms the means when the pin moves to the signalling position. This gives an optical indication also that the clutch disc is worn.

The pin is so mounted that it cannot be pushed completely out of the bore as a result of air pressure in the working chamber since the pin could then be lost. The mounting can for example be done so that the pin is provided with an additional radially extending means such as a flange or washer, which is disposed to rest against the stop in the signalling position of the pin and prevent further extension of the pin.

Additional advantages and characteristics of the invention are evident from the description below of an embodiment, with reference to the accompanying drawing, which is a partially cut-away side view of a servo mechanism for a vehicle clutch.

The figure shows a servo mechanism comprising a housing 1 with a cylindrical bore 2, in which a servo piston 3 is movable. The piston 3 is connected to a piston rod 4 which extends out through a lid 5 attached to the housing 1, for the cylindrical bore 2. The piston rod 4 is intended to be connected to a disc clutch very diagrammatically indicated at C in which the throwout bearing rests, without any play, against the clutch fingers. The figure shows the servo mechanism with the piston 3 in the position it assumes in the cylindrical bore 2 when the clutch disc is not worn. The distance between the piston 3 and the bottom 6 of the cylinder 2 is thus large.

The space 10 between the working piston 3 and the bottom 6 of the cylinder forms the working chamber of the servo mechanism, to which compressed air can be introduced under control of a clutch pedal P from a compressed air inlet 7 in an extension 8 of the housing 1 extending in the opposite direction to the piston rod 4. The housing extension 8 has at its end a pair of ears 9 for anchoring the mechanism in the vehicle.

When compressed air is introduced into the working chamber 10 between the piston 3 and the cylinder bottom 6 the piston 3 is displaced to the left in the drawing, so that its piston rod 4 disengages the disc clutch against the force of the springs in the clutch. The cylinder chamber 11 between the piston 3 and the lid 5 is evacuated through an opening 12.

When the compressed air pressure in the working chamber 10 ceases and the chamber is evacuated, the clutch springs return the disc to the engaged position. The piston rod 4 and the piston 3 are displaced to the right in the drawing. The greater the wear on the disc clutch the farther the piston 3 will be displaced to the right. When a new clutch disc is installed, the clutch, servo mechanism and linkage between them are adjusted so that when the clutch disc is completely or almost completely worn out the piston 3 will be very close to the cylinder bottom 6. To indicate that the clutch disc is worn down and to prevent the piston from coming into contact with the bottom 6 of the cylinder, thereby preventing full engagement of the clutch, the servo mechanism is provided with a warning device.

The warning device comprises a cylindrical pin 13, which is displaceable in a bore 14 parallel to the cylindrical bore 2, which extends through the bottom 6 of the cylinder from the working chamber 10 to the atmosphere. An O-ring 16 is placed in a ring groove 15 on the pin 13, which O-ring 16 in the position shown in the figure seals between the pin 13 and the end of the bore 14 directed away from the chamber 10. An axial channel 17 extends from the end of the pin 13 which extends into the chamber 10 to a radial opening 18 next to the ring groove 15 on its side facing the chamber 10.

The bore 14 extends via a conical portion 19 to a bore 20 of larger diameter than the bore 14. The pin 13 is provided within the bore 20 with two flanges 21, 22, between which a sealing collar 23 of rubber is fitted. The collar 23 rests against the wall of the bore 20 and prevents moisture and dirt from entering the bore 14.

The portion of the pin 13 directed away from the chamber 10 extends out of the bore 20 and ends with an end portion 24 of smaller diameter. A washer 25 rests against the annular step, which is formed at the transition of the pin 13 to the end portion 24. A cotter pin 26 inserted through te end portion 24 prevents the washer 25 from unintentionally falling off the pin 13. In the position shown in the figure the washer 25 lies against the side facing the cylinder bottom 6 of a stop 27 joined to the housing 1. The washer 25 is made of easily deformable material. An additional washer 28 of stronger material is loosely disposed on the pin 13 between the washer 25 and the flange 22. The washer 28 extends radially beyond the stop 27.

In the position shown in the figure the washer 25 rests against the stop 27 and prevents the pin 13 from being pushed by air pressure farther out of the chamber 10. The O-ring 16 seals the bore 14 and the servo mechanism functions normally.

When the clutch disc has been worn so much that the piston 3, when the clutch is re-engaged, is displaced to a position near to the bottom 6 of the cylinder 2, the piston 3 will come into contact with the end of the pin 13 and displace the pin to the right in the drawing. The stop 27 deforms the washer 25, thereby giving an optical indication that the clutch disc is worn. During this displacement of the pin 13 the O-ring 16 leaves the bore 14 opening the seal, whereafter the opening 18 of the channel 17 leaves the bore 14 and opens into the conical portion 19. An outlet path is thereby opened for compressed air from the working chamber 10 through the channel 17 to the bore 20. The compressed air can flow therefrom past the flexible collar 23 out into the free air. Thus when the driver depresses the clutch pedal the chamber 10 is pressurized and air flows from it out into the free air producing a powerful blowing sound, warning the driver that the clutch disc is worn. This acoustic signal is given off every time the clutch pedal is depressed. Since the air from the working chamber 10 flows out into the free air the working pressure in the chamber 10 also falls, and the driver must exert greater pedal pressure to complete the clutching operation. In this way also he is made aware of the worn clutch disc.

The washer 28 prevents the pin 13 from being pushed completely out of the bores 14 and 20 due to the effect of air pressure in the chamber 10, and being lost. The flange 22 comes into contact with the washer 28, which in turn comes into contact with the stop 27, thereby stopping the movement of the pin 13. When the worn clutch is replaced the cotter pin 26 is removed and the deformed washer 25 is replaced with a new washer when the pin 13 has been inserted into the chamber 10. The new washer 25 is locked with the cotter pin 26 and the warning device is then again ready for operation.

What I claim is:

1. A compressed air operated servo mechanism for a disc clutch, especially for motor vehicles, comprising a servo piston (3) movable in a cylinder (2), the piston rod (4) of which is connected to the clutch and is disposed to disengage the same when compressed air is supplied to the cylinder working chamber (10) between the piston (3) and the bottom (6) of the cylinder (2); a valve (13,14), which controls a connection (17,20) between the working chamber (10) of the cylinder (2) and atmosphere and which in the normal operating state of the servo mechanism keeps the connection closed; means (13) connected with the valve for sensing the position of the piston and disposed so that when the piston (3), as a result of a worn clutch disc, assumes a position close to the bottom (6) of the cylinder it transfers the valve to its open position whereby air from the working chamber (10) flows through the connection (17,20) and gives an acoustic signal as well as a pressure signal in the clutch pedal so as to warn the driver.

2. A servo mechanism according to claim 1, characterized in that the valve comprises an externally observable valve member (13,24) which assumes a warning position in the open position of the valve, thereby giving an optical indication of the clutch condition.

3. A servo mechanism according to claim 1, characterized in that said means comprises a pin (13) displaceably disposed in an axial bore (14,20) in the bottom (6) of the cylinder with its inner end extending into the path of motion of the piston (3) near the bottom (6) of the cylinder, that the pin (13) in its inner normal position, unaffected by the piston (3), seals the bore shut, and that the pin (13), in an outwardly displaced signalling position caused by the motion of the piston (3), opens an air flow path through the bore (14,20).

4. A servo mechanism according to claim 3, characterized in that the pin (13) in its normal position extends with its outer end beyond the bottom (6) of the cylinder and is provided at its outer end (24) with a radially extending deformable means (25), which follows the extension motion of the pin (13) to the signalling position, and that a fixed stop (27) is so disposed in the path of motion of the means (25) that it deforms the means (25) when the pin (13) moves to the signalling position.

5. A servo mechanism according to claim 4, characterized in that the pin (13) is provided with an additional radially extending means (28) such as a flange or washer, which is disposed to rest against the stop (27) in the signalling position of the pin (13) and prevent further extension of the pin.

* * * * *